United States Patent
Hintz et al.

(10) Patent No.: US 7,312,855 B1
(45) Date of Patent: Dec. 25, 2007

(54) COMBINED COHERENT AND INCOHERENT IMAGING LADAR

(75) Inventors: Robert T. Hintz, Ridgecrest, CA (US); Rudolf G. Buser, Wall, NJ (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/591,666

(22) Filed: Oct. 26, 2006

(51) Int. Cl.
*G01C 3/08* (2006.01)
*G01N 21/00* (2006.01)

(52) U.S. Cl. .................... 356/4.01; 356/5.15; 356/342

(58) Field of Classification Search ............... 356/4.01, 356/5.01, 5.15, 337, 342; 359/399; 382/103, 382/106
See application file for complete search history.

(56) References Cited

U.S. PATENT DOCUMENTS

| | | | | |
|---|---|---|---|---|
| 4,600,889 A | * | 7/1986 | Rugen | 342/199 |
| 5,353,109 A | * | 10/1994 | Langdon et al. | 356/28.5 |
| 5,661,577 A | * | 8/1997 | Jenkins et al. | 359/11 |
| 5,751,830 A | * | 5/1998 | Hutchinson | 382/103 |
| 5,867,257 A | * | 2/1999 | Rice et al. | 356/28.5 |
| 6,836,320 B2 | * | 12/2004 | Deflumere et al. | 356/141.1 |
| 2006/0139620 A1 | * | 6/2006 | Hopwood et al. | 356/5.15 |
| 2007/0097352 A1 | * | 5/2007 | Cardero et al. | 356/5.15 |
| 2007/0165205 A1 | * | 7/2007 | Williams et al. | 356/5.15 |

* cited by examiner

*Primary Examiner*—Isam Alsomiri
(74) *Attorney, Agent, or Firm*—Laura Foster; David S. Kalmbaugh

(57) ABSTRACT

A long range eye-safe laser radar (LADAR) system for use in an environment where real-time non-cooperative identification of an object is required. In particular, a laser beam is aimed at an object, the laser energy reflected from the object is collected by a detector array for use in generating a composite of both a high resolution 3-Dimensional (3D) shape of the object and the object's high resolution micro-Doppler vibration spectrum, a characteristic of the object as unique as a fingerprint. The composite is then used to automatically identify the object by comparison to a database of similar composite sets of 3D shape and vibration spectrum information with the results of the identification conveyed to the user.

6 Claims, 3 Drawing Sheets

COMBINED COHERENT AND INCOHERENT IMAGING LADAR

BACKGROUND OF THE INVENTION

1. Field of the Invention

The present invention relates generally to a long range eye-safe laser radar (LADAR) system for use in an environment where real-time non-cooperative identification of an object is required. In particular, a laser beam is aimed at an object, the laser energy reflected from the object is collected by a detector array for use in generating a composite of both a high resolution 3-Dimensional (3D) shape of the object and the object's high resolution micro-Doppler vibration spectrum, a characteristic of the object as unique as a fingerprint. The composite is then used to automatically identify the object by comparison to a database of similar composite sets of 3D shape and vibration spectrum information with the results of the identification conveyed to the user.

2. Description of the Prior Art

LADAR systems are used in a wide variety of military and civilian applications. Common uses of LADAR systems are determining the range of objects, determining the velocity of moving objects and the capturing of 3D characteristics of objects. The use of LADAR systems to aid civilian law enforcement and the military in the non-cooperative identification of subjects and objects is well under way. LADAR systems for use in automatic target identification have been investigated by the United States Department of Defense's Automatic Target Recognition Working Group. The current state of the art will produce high reliability target ID based on 3-D shape information derived from 25 pixels per square meter of target with range accuracies of a few inches and acceptably low false alarm rates. However, 3D LADAR lacks the ability to discern the object's micro-Doppler vibration spectrum. Recently, the Research Institute for Optronics and Pattern Recognition under the direction of the German Defense Research Establishment has demonstrated the potential for object identification using spatially resolved micro-Doppler imaging, but the design lacked the ability to develop simultaneous 3D image information. Characterization of an object's vibration spectrum using micro-Doppler analysis is well underway and is the subject of numerous inventions and papers. Eye-safe LADAR systems are the subject of a wide variety of implementations and have been demonstrated by many foreign and domestic entities.

Current eye-safe LADAR systems do not provide the capability to simultaneously collect, on a single focal plane array in real-time, both the coherent laser energy necessary for high spatially resolved micro-Doppler imagery and the incoherent laser energy for high range resolution necessary to generate 3D images. Also lacking in current LADAR systems is the capability to perform signal processing sufficient to create a micro-Doppler signature and 3D image composite that is unique to each object. Making the signature and image composite available for comparison to a database of known signature and image composites can lead to the automatic non-cooperative identification of an object, a feature not available in current LADAR systems. Automatic real-time non-cooperative identification of an object is a long sought capability for both civilian and military organizations. The present invention, a Combined Coherent and Incoherent Imaging LADAR, corrects deficiencies existing in the current state of the art.

SUMMARY OF THE INVENTION

The LADAR system that is the subject of this invention can simultaneously sense and signal process a combination of incoherent and coherent laser radiation reflected from an object leading to the non-cooperative identification of the object at long ranges. The transmit laser portion of the LADAR transmits a modulated continuous wave (CW) laser beam, or a laser pulse, that illuminates the object that is to be identified. Laser radiation reflected from the object is sensed by each pixel making up the detector array. The radiation is simultaneously transformed, by the semiconductor material in each pixel of a detector array, into electrical signals containing either high spatially resolved micro-Doppler information to generate the object's vibration spectrum, or high range resolution information to produce 3D imagery of the object. The unique dual sensitivity of the detector array is accomplished by the application of a local oscillator laser beam to a select portion of the detector array making that portion of the detector array sensitive to coherent energy, while the remaining portion of the detector array senses incoherent energy. The electrical signals on the output side of that portion of the array sensing coherent energy contain micro-Doppler vibration spectrum information, while the electrical signals on the output side of the remainder of the detector array sense incoherent energy and contain the 3D shape imagery. Novel signal processing algorithms applied to the electrical signals output by the detector array results in the automatic non-cooperative identification of the object, which is then conveyed to the user.

DETAILED DESCRIPTION OF THE PREFERRED EMBODIMENT

Figure 1:
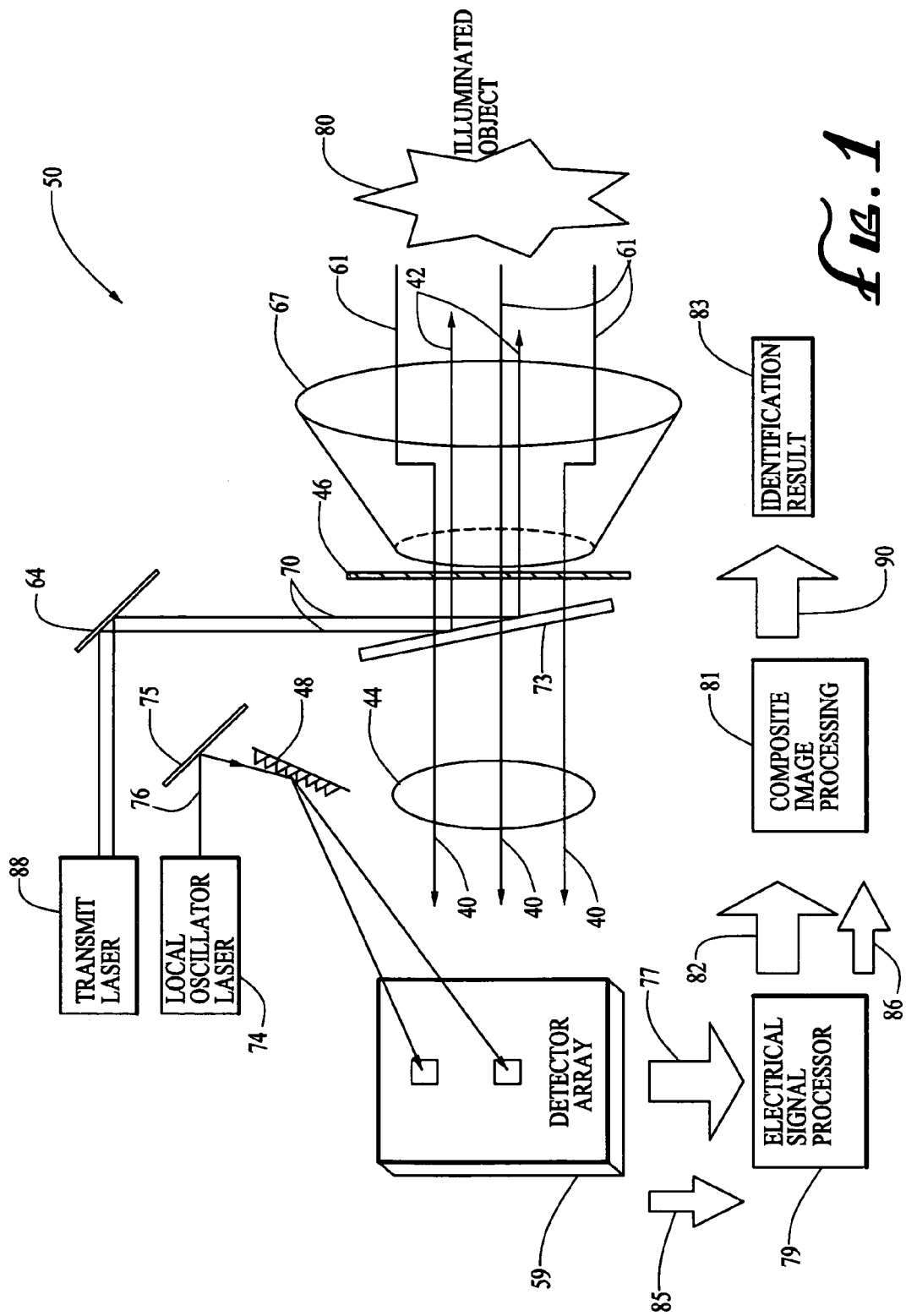
FIG. 1 is a drawing of a Combined Coherent and Incoherent Imaging LADAR system.

FIG. 1 depicts the preferred embodiment of the long range Combined Coherent and Incoherent Imaging LADAR system 50, where long range is the separation between the LADAR laser source and the object and is on the order of tens of kilometers.

Referring to FIG. 1, a linearly polarized CW type laser source 74 is used to generate a Local Oscillator (LO) laser beam 76 which illuminates elements of the detector array 59 used for coherent detection. A linearly polarized transmit laser source 88 is used to generate a transmit beam 70 which is used to illuminate the object 80 to be identified. The transmit laser source 88 must provide either a modulated continuous wave (CW) or pulsed laser beam 70. Either a CW or pulsed laser source will produce the required signal to noise ratio for the waveform used to accurately measure range and micro Doppler information. Although a CW waveform measures unambiguous frequency information from the target, there are techniques using coherent pulse burst waveforms which produces satisfactory results under many useful conditions. The pulse duration of the transmit laser 88 is nominally in the range of 1 nanosecond to 10 nanoseconds with pulse separations in the microsecond to millisecond region. The CW LO beam 76 produces shot noise limited operation in the detector array 59.

The transmit beam 70 in FIG. 1 has an emission wavelength between 1.4 µm to 1.8 µm which allows the LADAR system 50 to operate in the region of the spectrum where the eye is the most tolerant to laser radiation. Laser energy in this wavelength region is not focused on the retina and is only partially transmitted through the eye. This makes eye-safe lasers far less dangerous than lasers operating at other wavelengths with similar output power. It should be noted that given sufficient power, as reached with a fiber amplifier or with a Q-switched laser, the eye can still be damaged even at eye safe wavelengths.

The transmit laser source 88 of FIG. 1 is either an Erbium fiber or an Erbium crystal type laser operating at eye-safe wavelengths and is used to generate the transmit laser beam 70. The transmit laser beam 70 operating in the eye-safe wavelength region must be compatible in wavelength to the semiconductor material chosen for use in the detector array 59.

A typical embodiment uses a single CW laser source 74 to produce the local oscillator beam 76 which is directed towards the detector array 59 and a single transmit laser source 88 to illuminate the object 80. The frequency of the transmit laser source 88 is locked at a fixed frequency offset to the local oscillator laser 74 to produce the transmit beam 70. A telescopic lens 67 expands the transmit beam 70 to produce a low divergence output beam. The telescopic lens 67 also collects the reflected laser radiation 40 for focusing the reflected laser radiation 40 onto the detector array 59 by a lens 44.

Military and commercial equipment have competing requirements of high performance and maximum portability. In order to strike a balance between these two requirements a plurality of mirrors are used to direct the laser beams. A mirror 64 directs the transmit laser beam 70 onto the polarized beam splitter 73. A mirror 75 is used to direct the linearly polarized LO laser beam 76 towards a diffractive element 48 for further directing the LO laser beam 76 onto selected elements of the detector array 59. Any number of mirrors may be used to direct and redirect the transmit laser beam 70 or the LO laser beam 76 to conform to the spatial requirements that drive portability.

Generally, arrays are configured as either a staring focal plane array (FPA) or a scanning FPA. A scanning FPA configuration typically uses a linear array of detectors that are subjected to a high rate of successive returns that differ for each azimuth and elevation position, as determined by the slew rate of a motorized mechanism that controls movement of a scan mirror. The staring FPA has a fixed position detector array and a laser source that has a fixed line of sight relative to the fixed position detector array. The staring FPA captures a complete image with every laser exposure and is capable of producing the highest frame rate LADARs which are capable of freezing moving objects in the scene. In contrast a scanning array must sweep the entire field of view to produce a single frame of imagery and as such typically has much slower frame rates resulting in smearing of moving targets in the scene. The staring FPA is the preferred embodiment for this invention.

Referring to FIG. 1, the detector array 59 transforms the impinging reflected laser radiation 40 into output electrical signals 77 and 85 for further signal processing by an electrical signal processor 79. The output signals 82 and 86 of the electrical signal processor 79 are routed to a composite image processor 81 where an executable software program running on a general purpose digital computer derives the object's identification 90 which is conveyed to the user as an identification result 83.

The laser source selected must generate a laser transmit beam 70 that is linearly polarized. The linearly polarized laser transmit beam 70 is directed onto the polarizing beam splitter 73 by mirror 64. The polarizing beam splitter 73 reflects the linear polarized transmit beam 70 through a quarter wave plate 46 which converts the linearly polarized transmit beam 70 into circularly polarized laser transmit beam 42. The circularly polarized laser transmit beam 42 passes through the telescopic lens 67 towards the object of interest 80. The handedness of the polarization in the reflected radiation 61 is reversed, relative to the polarity of the circularly polarized laser transmit beam 42. An example is, the right hand circular polarization is reversed and is now left hand circularly polarized. The reflected radiation 61 is collected by the telescopic lens 67 and is passed through the quarter wave plate 46 and is converted back to linearly polarized light 40 that is orthogonal to the laser transmit beam 70. The linearly polarized light 40 passes through the polarized beam splitter 73. After passing through the beam splitter 73 the light is collected and focused onto the detector array 59 by a lens 44.

The polarized beam splitter 73 is an off the shelf component that is available from a number of manufacturers in industry and is known and understood by those in the art. Selection of the appropriate beam splitter requires that the wavelength range, wave front aberration and polarized ray characterizations be determined after selection of the transmit laser source 88.

Key to the Combined Coherent and Incoherent Imaging LADAR system 50 depicted in FIG. 1 is the unique configuration of the detector array 59.

Figure 2:
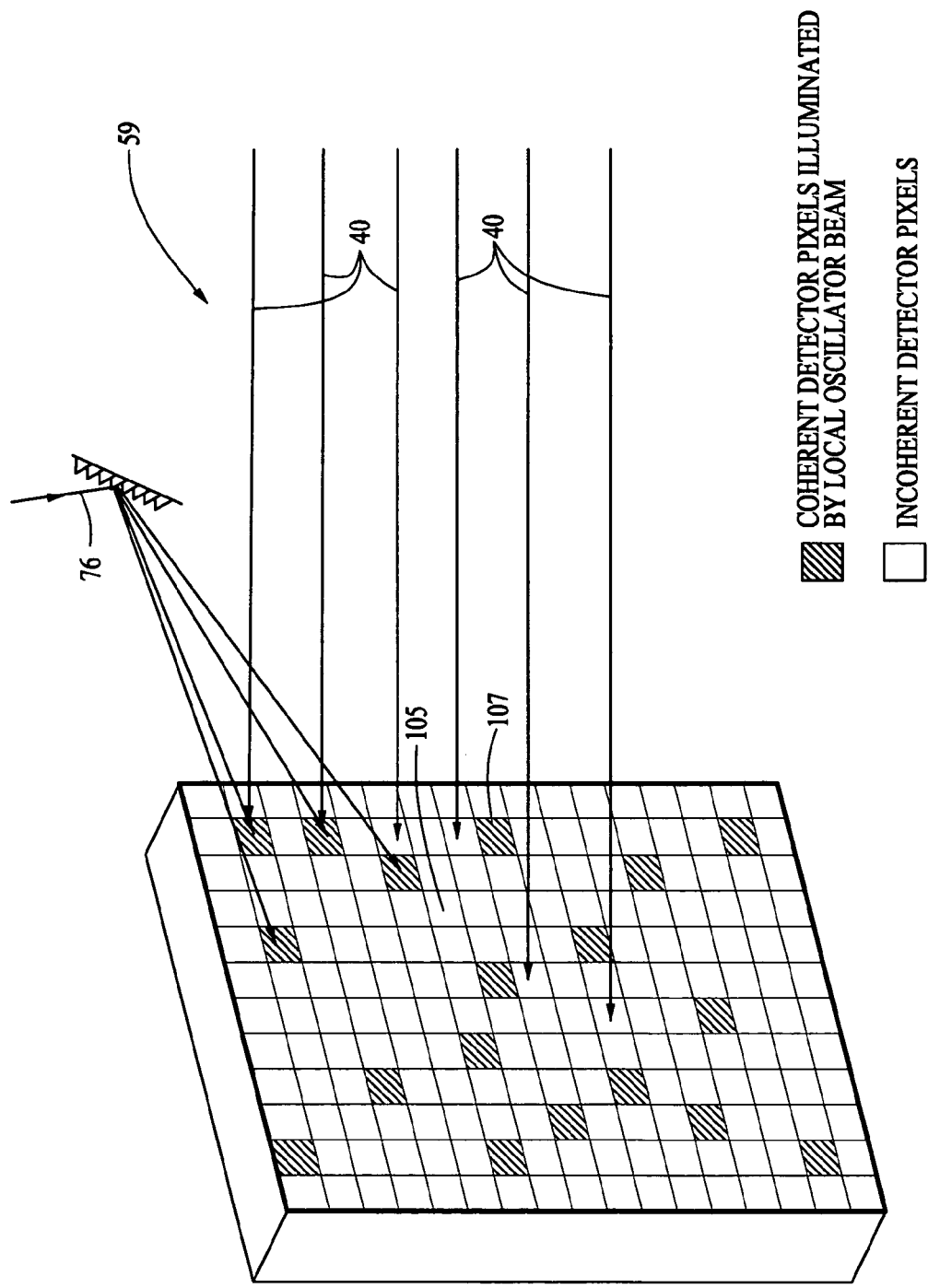
FIG. 2 is a drawing of the detector array and the embedded coherent array of the LADAR system of FIG. 1.

Referring to FIG. 2 the detector array 59, which is identical to the detector array 59 of FIG. 1, contains a number of detector elements constructed from a semiconductor material. The semiconductor material and configuration of the detector array define the key parameters of the LADAR such as wavelength sensitivity, detection response recovery time, speed of outputting the electrical signal that corresponds to a given detection and resolution of received pulses as well as the overall LADAR field of view.

The recommended semiconductor materials used to fabricate the detection pixels that make up the detector array 59 is a combination of the elements; Indium Gallium Arsenide (InGaAs) or a combination of the elements Mercury Cadmium Telluride (HgCdTe). These semiconductor materials, InGaAs and HgCdTe, are sensitive to eye-safe laser wavelengths, they support the required recovery time, both can be configured to output an electrical signal that corresponds to a given pulse detection and are compatible with standard electronic circuits. These semi-conductor materials are currently in use as detection pixel material in a number of existing applications. A Complimentary Metal Oxide on Silicon (CMOS) substrate serves as a suitable, low power, high-speed backplane to which each element in the detector array 59 is bonded. CMOS technology is well know in the art and provides a short delay time for transforming the output of each pixel in the detector 59 to an electrical signal suitable for further signal processing. Electronic circuits that are compatible with CMOS level signals are well known to those in the art. The detector array 59 is electrically connected to an electrical signal processor 79 having a set of read out integrated circuits (ROICs) which perform signal conditioning functions such as pre-amplification, amplification, range and frequency measurement. The on the chip processing for the detector array 59 is very limited and standard external electronic circuitry in the form of ROICs, are needed to derive useful signal information.

Generally, the time required to make a range measurement is the length of the transmit pulse or modulation cycle, plus time of flight, which is defined as the round trip to the target and back, and whatever signal processing delays that occur in the derivation of the required range, micro-Doppler and macro-Doppler information. The time required to make a Doppler measurement is determined by the required sampling time for the level of frequency information required, per Nyquist considerations, the time of flight, and the processing time to produce the desired information. In the preferred embodiment each detector pixel must make multiple range measurements for each pulse Referring to FIG. 2, a number of pixels are assembled to produce the entire detector array 59 where the preferred embodiment is nominally a detection array of 128×128 pixels arranged in a square. The shape of the entire detector array 59 is not limited by 128×128 pixels nor is it limited to any fixed geometric shape. The detector array 59 is partitioned into two distinct operational portions. One portion is designated as the first portion and is made up of the first portion pixels 107 which are sensitive to the coherent reflected laser radiation 40 (FIG. 1) and are simultaneously the target of the LO beam 76, where the LO beam 76 FIG. 1 is identical to the LO beam of FIG. 2. The first portion pixels support mixing of the LO laser beam 76 with the coherent backscattered light. The remaining detector array pixels are designated as a second portion pixels 105.

Referring to FIG. 2, the first portion pixels 107, typically incorporates one tenth of the total available detector pixels. The first portion pixels 107 will be distributed amongst the second portion pixels 105. The LO beam 76 must only illuminate the first portion pixels 107 to avoid unnecessary heating of the detector substrate. This discrete application of LO beam 76 power to all of the first portion pixels 107 can be accomplished with a diffractive element 48.

Reflected laser pulses 40 (FIG. 1) share a common polarization state, but also contain the modulation format of the transmit beam 70 such as phase, frequency, amplitude, pulse width that is processed to produce the range Doppler measurement. The first moment or mean value of the frequency spectrum yields the illuminated object's 80 (FIG. 1) mean velocity which is the macro-Doppler information.

Coherent operation of the first portion of the detector array 107 (FIG. 2) begins by illuminating the first portion of the detector array 107 with a CW laser beam 76 produced by a local oscillator 74 (FIG. 1). The detector array 59 responds to the square of the total optical field illuminating it and, therefore, produces the cross product of the backscattered and LO optical fields. Both the backscattered and LO fields are sinusoids, as are their cross products. It will be appreciated that these products must contain both sum and difference frequency terms. The LO frequency is usually offset from the anticipated frequency of the backscattered light 40; contrast, polarization, direction, and curvature of the local oscillator 74 output must closely match that of the backscattered light 40. The desired vibration spectrum information is contained in the first portion of the detector array's output signal 85 (FIG. 1) that oscillates at the frequency difference between the laser beam generated by the local oscillator 76 and the Doppler shifted backscattered light 40. This oscillating output electrical signal 85 may be conveniently processed with standard electronic circuits that are part of the electrical signal processor 79.

This LADAR system exhibits greater sensitivity overall by using a dual mode, coherent and non-coherent, detector array 59 versus a single mode detector array.

The dual mode detector array 59 is the preferred embodiment. The greater sensitivity of the dual mode is primarily attributed to the coherent operation of the first portion of the detector array 107 in conditions of low signal-to-noise ratio (SNR). This is due to four reasons.

First, a mode of operation called shot noise limited (SNL) may be employed. This is possible because both the incident signal power (square of the current) generated by the backscattered light 40 (FIG. 1) and the LO shot noise power generated by the incident LO beam 76 are mixed and both become part of the output electrical signal 85 of the detector array 59 and are proportional to the incident LO beam's 76 optical power. The power of the LO beam 76 may be increased until the LO shot noise dominates the other noise sources, such as background light, dark current, Johnson (thermal) noise, and amplifier noise. The incident signal power of the backscattered light 40 is proportionally increased automatically with the increasing LO shot noise power. This procedure, equivalent to setting the other noise sources to zero, can greatly increase the SNR.

Second, the oscillating output electrical signal 85 of the detector array 59 is only due to photons which are spatially phase matched to the oscillation frequency of the LO 74, effectively eliminating noise from background light at other wavelengths and from other directions. Therefore, coherent LADAR is not degraded by daytime operation.

Third, the output electrical signal 85 oscillates at the frequency difference between the oscillation frequency of the LO 74 and the backscattered light 40 which is passed through a very narrow band electronic filter to eliminate all noise in the frequency regions outside the predicted signal locations. This is only possible because the optical heterodyne (homodyne) process preserves the spectrum of the optical signal; simply translating it from terahertz to megahertz.

Fourth, the higher frequency of the output electrical signal 85, the frequency difference between the oscillation frequency of the LO 74 and the backscattered light 40, is selectable by the system designer which results in less 1/f noise.

Referring to FIG. 1, in order to derive the vibration spectrum of an object, the local oscillator 74 and the quiescent electrical signal 85 produced by the first portion of the of the detector array 107 each must have natural oscillation linewidths that are narrower than the spectrum of the induced phase deviations obtained from the backscattered light 40. This is significant because the stability of the laser source over the time of flight of the laser beam must be less than the frequency difference to be observed.

The capability to generate the 3D image of an object by using an eyesafe imaging laser has been the subject of a number of commercial and military field trials.

The tested systems have been built and demonstrated by the U.S. Navy, United States Army, U.S. Air Force, the Spanish Ministerio de Defensa, and the Canadian National Defense Force. The current capability of 3D imaging using lasers is described in article by Professor Andrew Wallace from the school of Engineering and Physical Sciences, Heriot-Watt University, Riccarton, Edinburgh, titled "3D Laser Imaging and Processing". Building a long range eyesafe laser source and compatible detector, as described above, is within the knowledge and ability of one skilled in this art.

The electrical output signal 77 from the second portion of the detector array 105 contains the 3D shape image information that feeds the electrical signal processor 79 where the signal is filtered for subsequent processing.

The filtered output signal, coherent electrical signal 82 and the incoherent electrical signal 86, are converted into a digital signal suitable for further processing by a composite image processing device 81 which hosts a general purpose digital computer. The general purpose digital computer must have a computer readable medium in the form of Read Only Memory (ROM) and Random Access memory (RAM). The computer readable medium is where the initialization software, the algorithms (FIG. 3) and data structures (FIG. 3) are described.

Figure 3:
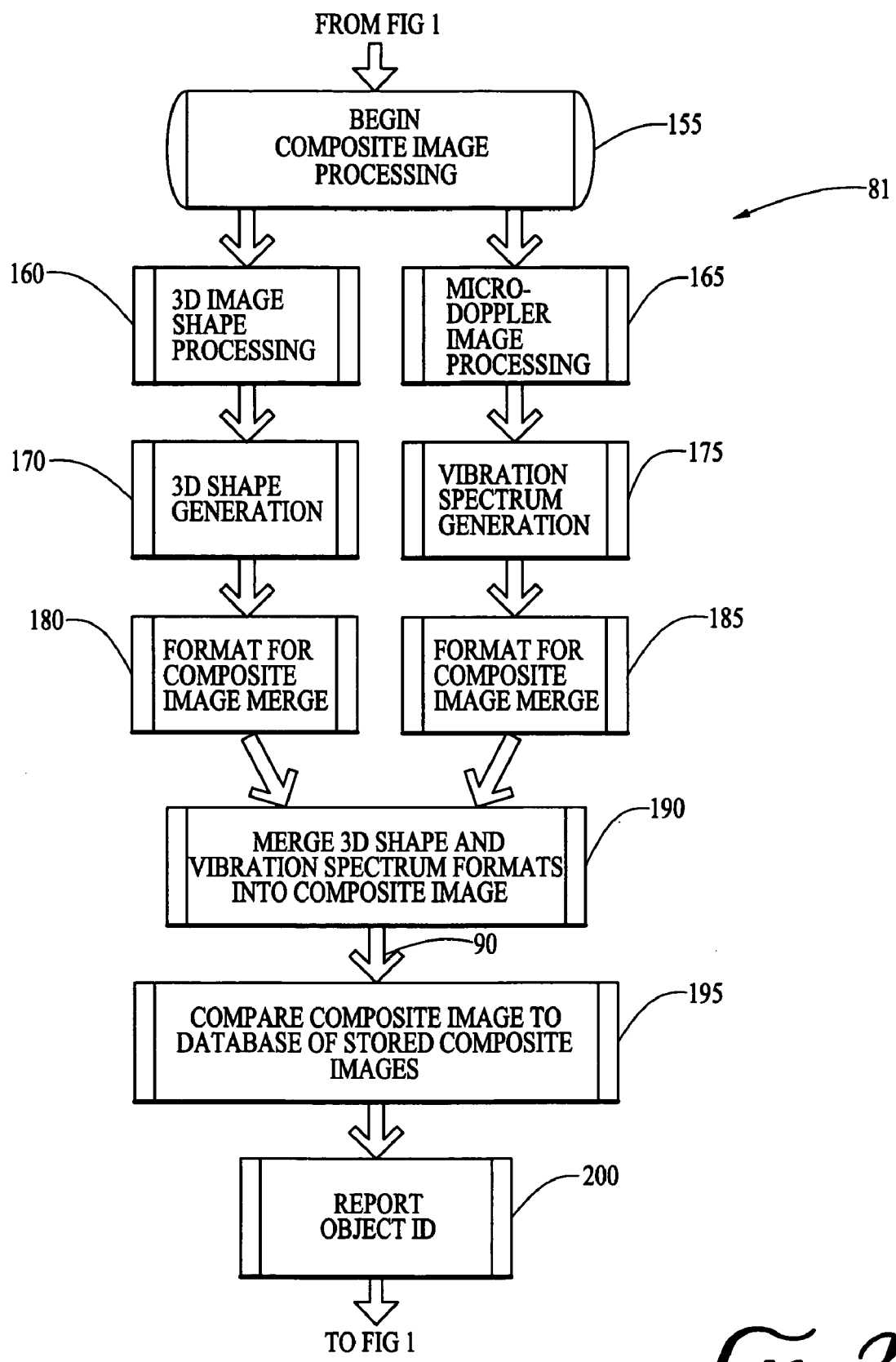
FIG. 3 is a flowchart of the composite image computer processing culminating in an object identification result as part of the LADAR system of FIG. 1.

The flowchart 81, which is the subject of FIG. 3, is an expansion of the software processing depicted in the composite image processing device 81 in FIG. 1. The subsequent composite image and object identification report 90 are both contained as an output 200 of the software programming flow represented FIG. 3.

Referring to FIG. 3, a flowchart for the software resident in device 81 (FIG. 1) and the steps that transform the digital output signals 86 and 82 of the electrical signal processor 79 into an identification result are depicted and further described.

The algorithms and supporting software modules 81 (FIG. 3) specific to generating the 3D shape image are written in a high level programming language capable of compilation and execution on a general purpose digital computer. The overall software processing timeline is set to a multiple of 30 Hz in order to match the 30 Hz clock that is used to synchronize the second portion pixel 105 imagery framerate to the CMOS backplane that provides the interface to the electrical signal processor 79. The 30 Hz hardware synchronization and software processing timeline is not fixed but may be any value that allows the hardware to clock out the detector array second portion pixel 105 data and still allows the software time to execute the complete processing timeline for device 81. The initial composite image processing module 155 requires an interface of standard electronic circuits that accepts the digital output 82 of the electrical signal processing device 79.

After an initialization of program memory space and variables, the initial composite image processing 155 begins by reading in and writing the digital data for the 3D shape image into a first series of buffers. The data in the first series of buffers are read out on a 30 Hz processing time-line into the 3D image shape software module 160. Data filtering and discrimination is performed as part of the 3D image shape software module 170 prior to composite image formatting performed in software module 180. The composite image formatting software module 180 translates the 3D shape image information into a format that can be merged with the micro-Doppler vibration spectrum information made available in a subsequent processing step performed by software module 190.

The algorithms and supporting software modules 81 (FIG. 3) specific to generating the micro-Doppler vibration spectrum image are written in a high level programming language capable of compilation and execution on a general purpose digital computer. The overall software processing timeline is set to a multiple of 30 Hz in order to match the 30 Hz clock that is used to synchronize the first portion pixel 107 imagery framerate to the CMOS backplane that provides the interface to the electrical signal processor 79. The 30 Hz hardware synchronization and software processing timeline is not fixed but may be any value that allows the hardware to clock out the first portion pixel 107 data and still allows the software time to execute the complete processing timeline for device 81. The initial composite image processing module 155 requires an interface of standard electronic circuits that accepts the digital output 86 of the electrical signal processing device 79.

After an initialization of program memory space and variables the initial composite image processing 155 begins by reading in and writing the digital data for the micro-Doppler vibration spectrum into a second series of buffers. The data in the second series of buffers are read out on a 30 Hz processing time-line into the micro-Doppler image processing software module 165 resulting in individually registered pixels which contain amplitude, range, macro-Doppler and micro-Doppler information. Data filtering and discrimination is performed as part of the micro-Doppler vibration spectrum software module 175 prior to composite image formatting performed in software module 185. The composite image formatting software module 185 translates the micro-Doppler vibration spectrum information into a format that can be merged with the 3D shape image information in a subsequent processing step performed by software module 190.

Referring to FIG. 3, the formatted information for the 3D shape image 180 and the formatted information for the vibration spectrum 185 are merged into a single composite image 90 (FIG. 1) by software module 190. This composite image 90 (FIG. 1) contains the object's 3D shape and unique micro-Doppler vibration spectrum signature in a format that can be used for comparison in a later processing step 195.

The single composite image 192 contains a set of attributes that are unique to the shape and vibration spectrum of the object of interest and are organized into a plurality of data structures suitable for comparison to a searchable database containing sets of data structures for a wide variety of known objects. The searchable database of data structure sets containing the composite image of known objects that available for comparison are objects that the user expects to identify. A general example is, identifying an Abrams tank would require that composite images of representative Abrams tanks populate the searchable database with data structure sets that represent the alternative versions of Abrams tanks. The searchable database is populated with composite images of any type of vehicle, person, animal, weapon or object and is limited by physical ROM and RAM capacity. The comparison processing time line is directly proportional to the size of the searchable database.

The data structure for the merged composite image 192 is sequentially compared to each of the stored data structures in the searchable database 195 using an attribute by attribute comparison algorithm. Where each attribute of the composite image is stored in a field representing, but not limited to, shape of the object, distribution of the vibration spectrum over the illuminated object 80 of FIG. 1, distinguishing physical characteristics of the object, detailed vibration characteristics of the object and any unique combination of the attributes that are available for discrimination. These attributes are linked together in a single data structure that defines the illuminated object 80 of interest. Once a predetermined number of attributes for the object of interest meets a predetermined matching threshold with a set of attributes for a particular data structure stored in the database an identification result 200 may be declared and conveyed to the user. If the predetermined number of attributes for the object of interest does not meet the predetermined matching threshold for any set of attributes stored in the database an identification result 200 of unknown may be declared and conveyed to the user.

The identification result 200 is presented to the user on a visual display and appears as a computer generated image or as text describing the object of interest or any combination of the computer generated image and text. Alternatively, the identification result 200 is presented to the user through a headphone or speaker as an audible tone or audible message. Alternatively, the identification result 200 is presented to the user as any combination of a visual or audible message suitable for use as a non-cooperative target identification.

What is claimed is:

1. A laser radar system for producing a composite image for identifying a non-cooperative object of interest, comprising:
    (a) means for producing a transmit laser beam;
    (b) detector means for detecting coherent backscattered light from said transmit laser beam and incoherent backscattered light from said transmit laser beam;
    (c) means for generating a local oscillator laser beam to induce shot noise limited operation in said detector means;
    (d) optical means for optically expanding said transmit laser beam while simultaneously optically collecting said backscattered light for focusing onto said detector means;
    (e) means for directing said transmit laser beam towards said optical means;
    (f) means for reflecting said transmit laser beam through said optical means to said object of interest while simultaneously passing detected backscattered light;
    (g) means for generating a first electrical signal containing micro-Doppler vibration spectrum information obtained from said detector means which is caused by an interaction of said detected backscattered light and said local oscillator beam with a first portion of an array within said detector means;
    (h) means for generating a second electrical signal containing three dimensional shape image information obtained from said detector means which is caused by an interaction of said detected backscattered light with a second portion of the array within said detector means;
    (i) processor means for processing said first and second electrical signals received from the output of said detector means wherein said processor means performs signal conditioning, pre-amplification, amplification, range measurements, frequency measurements, and discriminating phase differences resident in said coherent backscattered light;
    (j) image generating means for generating a single composite image, responsive to digital signals output by said processor means, wherein said digital signals includes said three dimensional shape image information and said micro-Doppler vibration spectrum information; said image generating means merging said three dimensional shape image information with said micro-Doppler vibration spectrum information;
    (k) means for transforming said single composite image into a set of data structures for retrieval from a computer readable medium;
    (l) comparison means for comparing said set of data structures to a plurality of data structure sets representative of known objects for identifying said non-cooperative object of interest; and
    (m) means for interfacing a user to the output received from said comparison means whereby a user is appraised of identification of said non-cooperative object.

2. The laser radar system of claim 1, wherein said detector means for detecting said coherent backscattered light and said incoherent backscattered light is uniformly constructed of a single type of semiconductor material.

3. The laser radar system of claim 2, wherein said transmit laser beam has an emission wavelength in the range of 1.4 µm to 1.8 µm.

4. The laser radar system of claim 1, wherein said means for detecting said coherent backscattered light and said incoherent backscattered light is a staring focal plane array.

5. The laser radar system of claim 1, wherein said image generating means for generating a single composite image further comprises means for storing, means for retrieving and means for processing said single composite image.

6. The laser radar system of claim 5, wherein said image generating means for generating said single composite image further comprises a plurality of data structure fields including:
    (a) a first field containing data representing said three dimensional shape of said object of interest;
    (b) a second field containing data representing said micro-Doppler vibration spectrum information of said object of interest;
    (c) a third field containing data representing physical characteristics of said object of interest; and
    (d) a fourth field containing detailed vibration characteristics extracted from said micro-Doppler vibration spectrum information.

* * * * *